United States Patent [19]

Belsanti

[11] Patent Number: 4,476,842

[45] Date of Patent: Oct. 16, 1984

[54] INTERCOOLER DAMPER SUPPORT

[75] Inventor: James F. Belsanti, Blue Island, Ill.

[73] Assignee: Allis-Chalmers Corporation, Milwaukee, Wis.

[21] Appl. No.: 419,930

[22] Filed: Sep. 20, 1982

[51] Int. Cl.³ .......................... F02B 29/04; F28F 7/00
[52] U.S. Cl. ...................................... 123/563; 165/69
[58] Field of Search .......................... 123/563; 60/599; 165/159, 160, 163, 161, 173, 52, 69, 51

[56] References Cited

U.S. PATENT DOCUMENTS

| | | | |
|---|---|---|---|
| 1,431,896 | 10/1922 | Rait | 165/52 |
| 1,593,244 | 7/1926 | Cutler | 165/69 |
| 2,610,832 | 9/1952 | Holmes | 165/69 |
| 3,199,582 | 8/1965 | Vogt | 165/69 |
| 3,212,567 | 10/1965 | Romanos | 165/69 |
| 3,583,478 | 6/1971 | Fieni | 165/69 X |
| 3,881,455 | 5/1975 | Belsanti | 123/563 |
| 4,191,148 | 3/1980 | Patel | 123/563 |

Primary Examiner—Michael Koozo
Attorney, Agent, or Firm—Arthur L. Nelson

[57] ABSTRACT

An engine intercooler has an inlet passage receiving heated air from the turbocharger, an intercooler core and a plurality of outlet passages directing air to the engine cylinders. The housing of the intercooler is divided by the core into a plenum chamber for receiving air and an air intake chamber delivering air to the engine cylinders by way of the outlet passages. The core is supported at its opposite ends and is also supported by a perforated intermediate support plate which includes a pair of deflector surfaces directing incoming air in opposite directions to aid in distributing air evenly through all portions of the intercooler core.

10 Claims, 4 Drawing Figures

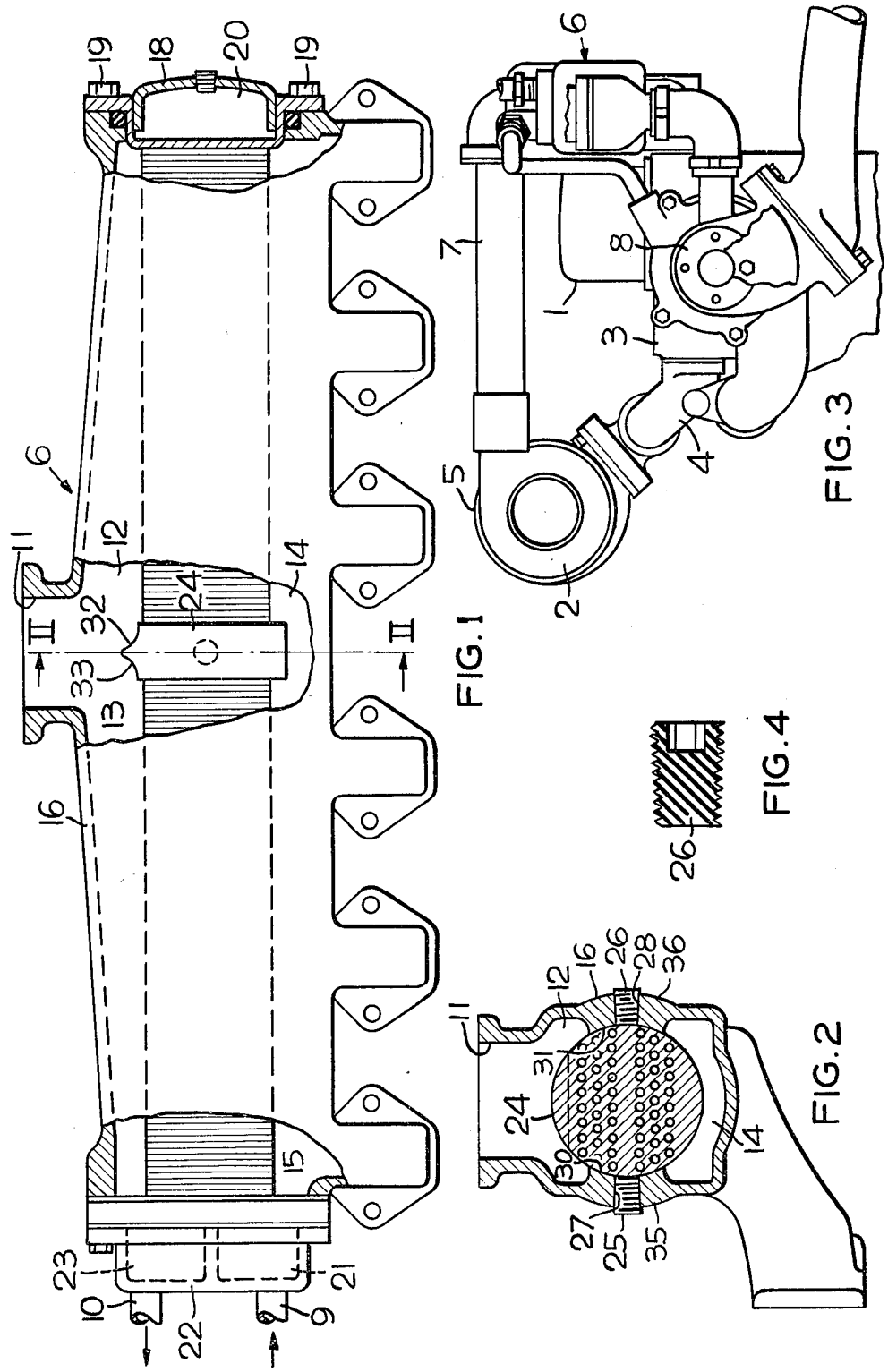

INTERCOOLER DAMPER SUPPORT

This invention relates to an intercooler for an internal combustion engine and, more particularly, to a damper support on the intermediate portion of the intercooler core to reduce vibrations, provide greater support and improve reliability.

Intercoolers on internal combustion engines generally extend the length of the engine for cooling the incoming air as it is supplied to the engine. Compression of air in the compressor of a supercharger increases the temperature of the air supplied to the intercooler. To increase the charge of air supplied to any cylinder the air is cooled in the intercooler.

The Belsanti patent, U.S. Pat. No. 3,881,455, shows an intercooler on an internal combustion engine. Both ends of the intercooler are supported and the intermediate portion is carried on a mating configuration of the housing so that the intake manifold, which directs the air through the intercooler core, also provides a measure of support for the length of the intercooler core. In order to facilitate assembly and disassembly of the intercooler core in the intake manifold, a limited clearance is provided between the core and the mating walls of the intake manifold. This clearance will allow some vibration of the intercooler core in the normal operating position. Accordingly, this invention provides for an intermediate support and means of damping vibrations of the intercooler core at the intermediate support. The support for the core is constructed in such a manner as to divide the incoming air which is directed into the central portion of the intercooler. This avoids a hot air current in the middle of the intercooler core because of the air tending to flow directly from the intake passage through the intercooler core to the air supply chamber for the combustion chambers. The air flow divider produces a means of equally distributing the air to both sides of the intercooler core for even distribution of the air flow through the intercooler core.

It is an object of this invention to provide an intercooler core support centrally supporting the intermediate portion of the intercooler core to damp vibrations of the core in the intercooler.

It is another object of this invention to provide an intercooler core support plate on the central portion of the core to damp vibrations of the core. Means on the support plate operates as an air divider to evenly distribute the air flow across the total cooling surface of the intercooler core.

It is a further object of this invention to provide an intercooler core support including a plate supporting the core of the central portion to damp vibrations of the core and an air divider on the support to divide the incoming air flow to evenly distribute the air flow across the total cooling surface of the intercooler core and lower the peak temperature of the air in the intercooler.

The objects of this invention are accomplished by providing end supports for the intercooler core and an intermediate support carrying the central portion of the intercooler core which is mounted in the intake system between the supercharger discharge passage and the air supply chamber for the combustion chambers. The central support for the intercooler core damps vibrations and is constructed to form an air divider for incoming air to evenly distribute the air flow across the total surface of the intercooler core. This reduces peak air temperatures and avoids a hot air stream through the center of the core. It provides a more even temperature over all portions of the intercooler and to the various combustion chambers of the engine. The core is slidably installed and fastened at both ends. The walls direct the air through the core and a resilient mount at the center portion of the intercooler core may be used to damp vibrations for quieter operation.

Referring to the drawings, the preferred embodiment of this invention is illustrated.

FIG. 1 illustrates the intake system with an intercooler core mounted in the intercooler partially in section to show the incoming passage and the outgoing passages of the intercooler.

FIG. 2 is a cross section view taken on line II—II of FIG. 1.

FIG. 3 is a front elevation view of an internal combustion engine.

FIG. 4 shows a form of a resilient mount for the intermediate plate on the intercooler core.

Referring to the drawings, an internal combustion engine 1 is shown with the supercharger 2 driven by the exhaust gases from the exhaust manifold 3 through conduits 4. The compressor 5 compresses incoming air which is transmitted to the intercooler 6 through a cross conduit 7. Water pump 8 circulates coolant through inlet passage 9 and outlet passage 10 of the intercooler 6.

The inlet passage 11 of the intercooler 6 receives compressed air from supercharger 2. The incoming air is fed into the plenum chamber 12 and then passes through the intercooler core 13 and is received in the air supply chamber 14 before it is supplied to any one of the six combustion chambers of the cylinders of the engine through the intake passages of which one, indicated by numeral 15, is shown in section. The intercooler 6 includes a housing 16 which houses the intercooler core 13. The intercooler core 13 is mounted with the bonnet 18 by a plurality of bolts 19 on the end of the housing 16. The bonnet 18 forms a return chamber 20 which is connected to a plurality of passages shown in FIG. 2. Similarly, the opposite end of the intercooler forms an inlet chamber 21 in the bonnet 22 supplying coolant to the intercooler from the coolant pump. The return passages lead to the outlet chamber 23 and are returned to the coolant pump 8. A plurality of interleaved cooling fins are axially spaced along the coolant conduits to form the intercooler. The center portion of the intercooler core includes the support plate 24. The support plate 24 is formed with a plurality of perforations to receive the plurality of coolant conduits as shown in FIG. 2. The support plate 24 conforms to the contour of the housing. The set screws 25 and 26 are fastened through the threaded openings 27 and 28 in the housing 16. The set screws may be formed with a resilient material to engage the core to dampen vibrations of the intercooler core at its central support. It is possible to use an ordinary set screw to rigidly fasten the intercooler at this position, if so desired. A resilient fastener, however, provides for damping of vibrations and has this advantage.

The support plate 24 is of a circular configuration matching the arcuate walls 30 and 31 of the intercooler shown in FIG. 2. The support plate 24 is also formed with arcuate surfaces 32 and 33 which deflects the incoming air toward the ends of the intercooler. This avoids the tendency of the air to pass straight through the middle of the intercooler core and produce a warm air current in the center of the intercooler. The air is deflected laterally to effectively produce an even rate of flow through all portions of the intercooler and to eliminate peak temperatures in any one portion so that a uniform air temperature is provided over the intercooler core.

The support plate 24 may be supported by resilient means, as shown in a modification shown in FIG. 4, to dampen vibrations of the core of the intercooler. The plate with the arcuate surfaces 32 and 33 deflect air to both ends of the plenum chamber 12 to provide even distribution of air and uniform flow through all portions of the intercooler to improve the operating condition of the engine. This is advantageous where a supercharger is used and an increased output of the engine is required. The peak combustion temperatures for each of the cylinders must be maintained substantially equal for good operation of the engine.

The embodiments of the invention in which an exclusive property or privilege is claimed are defined as follows:

1. An internal combustion engine comprising, an air intake system including, means defining an inlet passage and a plenum chamber for receiving air from a supercharger, an air intake chamber and passages for supplying air to the engine cylinders, means defining an intercooler core chamber for cooling air flowing from said plenum chamber to said air intake chamber including chamber walls intermediate the plenum chamber and said intake chamber, an intercooler core having a plurality of cooling fluid conduits extending the length of said core mounted in said core chamber, support means on the ends of said intercooler core carrying the end of said core, a plurality of cooling fins interleaved between the end supports on said cooling fluid conduits, a perforated intermediate support plate on the center portion of said intercooler core having mating side surfaces adjacent said core chamber walls, an air deflector on said support plate aligned with said inlet passage for distributing air over said intercooler core, damping means on said core chamber walls engaging said support plate providing an intermediate support for damping vibrations.

2. An internal combustion engine as set forth in claim 1 wherein said air divider on said intermediate support plate of said intercooler core includes means defining arcuate deflecting surfaces for deflecting incoming air toward both ends of said intercooler core for even distribution of air flow through all portions of the cooling core.

3. An internal combustion engine as set forth in claim 1 wherein said damping means for said intermediate support plate includes resilient mounts for supporting said plate on opposing sides of said intercooler core.

4. An internal combustion engine as set forth in claim 1 wherein said inlet passage defines a central passage for directing air to said air deflector of said support plate and wherein said air deflector includes a pair of surfaces directing air in opposite directions, toward opposite ends of said plenum chamber.

5. An internal combustion engine as set forth in claim 1 wherein said support plate defines symmetrical arcuate air deflecting surfaces for directing incoming air toward both ends of said intercooler core for uniform air flow through all cooling surfaces of said intercooler core.

6. An internal combustion engine as set forth in claim 1 wherein said inlet passage includes means centrally mounting said inlet passage on said plenum chamber for supplying air to said plenum chamber, means axially aligning said air deflector with said inlet passage on opposing sides of said support plate for diverting air flow to both ends of said intercooler core for uniform flow through the intercooler core.

7. An internal combustion engine as set forth in claim 1 wherein said support plate includes a screw fastener for threadedly engaging a threaded openind in the wall of said intercooler core chamber.

8. An internal combustion engine as set forth in claim 1 wherein said damping means includes two diametrically mounted resilient supports supporting said intermediate support plate.

9. An internal combustion engine as set forth in claim 1 wherein said core defines a circular cross sectional configuration of said intercooler core, means defining arcuate intercooler core chamber walls mating the external surface of said core.

10. An internal combustion engine as set forth in claim 1 wherein said intermediate support plate includes two set screws mounted in the intercooler core chamber walls.

* * * * *